United States Patent [19] [11] 3,751,879
Allington [45] Aug. 14, 1973

[54] APPARATUS FOR REDUCING THE DISSOLVED GAS CONCENTRATION IN A LIQUID

[75] Inventor: Robert W. Allington, Lincoln, Nebr.

[73] Assignee: Instrumentation Specialties Company, Lincoln, Nebr.

[22] Filed: Apr. 26, 1971

[21] Appl. No.: 137,381

[52] U.S. Cl. .................................. 55/158, 55/189
[51] Int. Cl. ............................................ B01d 13/00
[58] Field of Search ..................... 55/16, 158, 189; 117/161 ZA; 210/21–23, 321, 433, 456

[56] References Cited
UNITED STATES PATENTS

| | | | |
|---|---|---|---|
| 3,556,302 | 1/1971 | Agranat | 210/433 X |
| 3,367,850 | 2/1968 | Johnson | 55/158 X |
| 3,560,377 | 1/1969 | Loeffler | 210/433 X |
| 3,591,493 | 7/1971 | Zeineh | 210/433 X |
| 3,614,856 | 10/1971 | Sanz et al. | 55/158 X |
| 3,668,837 | 6/1972 | Gross | 55/158 |
| 3,335,545 | 8/1967 | Robb et al. | 55/158 X |
| 2,824,620 | 2/1958 | De Rossett | 55/16 |
| 3,332,216 | 7/1967 | Stern | 55/158 |
| 3,396,510 | 8/1968 | Ward et al. | 55/16 |
| 3,625,734 | 12/1971 | Ward | 55/158 X |

Primary Examiner—Samih N. Zaharna
Assistant Examiner—Richard W. Burks
Attorney—Vincent L. Carney

[57] ABSTRACT

Apparatus for reducing the dissolved gas concentration in a liquid, for example, a liquid flowing in chromatographic system, utilizing the ability of the gas dissolved in the liquid to pass through a gas permeable membrane. The liquid is exposed to one surface of the membrane and the opposite surface of the membrane is provided with a coating of gas-soluble substance for increasing the permeability of the membrane and thereby enhancing the permeation of the gas through the membrane. Further, in various embodiments of the invention, a chamber is provided opposite or surrounding the coated membrane and, in accordance with the teachings of the present invention, the chamber may be vented to the atmosphere, evacuated and sealed or communicated to a means for establishing a pressure in the chamber sufficiently lower than the pressure of the liquid exposed to the membrane such that the permeation of the gas through the membrane is enhanced. Additionally, the chamber may be provided with absorbent or adsorbent material for accommodating gas permeated through the membrane.

30 Claims, 7 Drawing Figures

Patented Aug. 14, 1973 3,751,879

- A—VACUUM PUMP
- B—VENTED TO ATMOSPHERE
- C—EVACUATED AND SEALED

- A—VACUUM PUMP
- B—VENTED TO ATMOSPHERE
- C—EVACUATED AND SEALED

INVENTOR
ROBERT W. ALLINGTON
BY
Cifelli, Behr & Rhodes
ATTORNEYS

Patented Aug. 14, 1973

A - VACUUM PUMP
B - VENTED TO ATMOSPHERE
C - EVACUATED AND SEALED

INVENTOR
ROBERT W. ALLINGTON

BY
*Cifelli Behr & Rhodes*
ATTORNEYS

Patented Aug. 14, 1973

- A-VACUUM PUMP
- B-VENTED TO ATMOSPHERE
- C-EVACUATED AND SEALED

INVENTOR
ROBERT W. ALLINGTON
BY
Cifelli, Behr & Rhodes
ATTORNEYS

APPARATUS FOR REDUCING THE DISSOLVED GAS CONCENTRATION IN A LIQUID

BACKGROUND OF THE INVENTION

1. Field of the Invention

This invention relates to apparatus for reducing the concentration of gas in a liquid, and in particular, to apparatus for reducing the concentration of gas dissolved or included in a liquid flowing, for example, in chromatographic systems, spectrophotometric systems, specific ion analysis systems, or thermal conductometric analysis systems, to prevent the dissolved or included gas from nucleating into bubbles.

2. Description of the Prior Art

There are numerous instances in the various arts such as noted by way of example in the above Field of the Invention, wherein it is useful, necessary, or highly desirable to reduce the concentration of a gas in a liquid, in particular, a gas dissolved or included in a liquid. For example, chromatographic systems often use optical means to monitor the liquid or eluate emanating from the separating apparatus. However, optical monitoring devices are extremely susceptible to error from spurious refraction readings which result from the presence of gas in the eluate. For example, the interfaces between the eluate liquid and the gas dissolved in the eluate will significantly change the refraction readings of the eluate, and if the dissolved gas nucleates into bubbles, the refraction readings are further changed and worsened with regard to validity. To insure the accuracy of the optical monitoring devices in chromatographic systems, it is necessary that all entrained gas bubbles and as much dissolved gas as possible be removed from the eluate of the chromatographic system.

In the past, the problem has been typically approached by efforts to prevent liquids with entrained or dissolved gases from entering into the chromatographic system, i.e., the liquid was treated prior to entering the system to drive out any possible gas. The treatment often consisted of boiling or evacuating bulk quantities of the liquid to be used. However, these methods only minimized the bubble formation problem in chromatographic apparatus, because quite often, the material used to pack the chromatographic separating systems contains quantities of gas on its surface regardless of any preliminary flushing with degassing solvents or any other treatment that can be used to remove the dissolved gas.

Still another prior art method of degassing the stream of liquid in a chromatographic column was based on the principle of floatation or buoyancy. In this approach the liquid stream is allowed to enter a chamber at the same pressure as the optical cell and the dissolved gases would form bubbles and float up to a collection chamber. This has proven generally unsatisfactory because the bubbles may not form in the proper place for extraction, and further, no means are available to extract the dissolved gases from the liquid-filled system. This approach also causes unwanted broadening of zones or peaks of dissolved solid material being carried by the liquid stream.

A preferred solution to the problem of removing the gas from or reducing the gas concentration of, the eluate of a chromatographic system, would be to treat the eluate intermediate the separating system and the optical monitoring device, rather than treating the eluate prior to entering the separating system. However, apparatus by which this treatment could be accomplished has not heretofore been available.

For example, the gas separation devices disclosed in U.S. Pat. Nos. 3,246,449, 3,246,450 and 3,463,615 are not wholly satisfactory for removing gas from, or reducing the gas concentration of, the eluate of a chromatographic system.

SUMMARY OF THE INVENTION

To overcome the problems of the prior art set forth above, the present invention sets forth apparatus for reducing the gas concentration in a liquid, wherein, in one embodiment of the present invention, the gas is exposed to one surface of a gas permeable membrane and the opposite surface of which membrane is provided with a gas-soluble coating for increasing the permeability of the membrane, the gas permeates through the membrane with the permeation thereof being enhanced by the gas-soluble coating. The gas-soluble coating may be a film of a solid or liquid in which the gas is appreciably soluble; silicone and fluorosilicone liquids and solid compounds being taught. In another embodiment of the present invention, the liquid to have the gas concentration therein reduced, for example the eluate from a chromatographic column, passes through a flow passage having at least one wall formed from at least a portion of a gas permeable membrane. The flow passage may be advantageously shaped in such a manner as to maximize the surface contact between the eluate and the permeable membrane. In various embodiments of the invention, a chamber may be provided opposite or surrounding the flow passage and in accordance with the teachings of the present invention, the chamber may be vented to the atmosphere, evacuated and sealed, or may be communicated with means for providing a pressure in the chamber sufficiently lower than the pressure in the liquid in the flow passage so as to enhance the permeation of the gas through the membrane. The surface of the membrane exposed to the chamber is provided with a gas-soluble coating for increasing the permeability of the membrane and for enhancing the permeation of the gas through the membrane. In various embodiments of the invention the coated membrane is self-supporting, and in other embodiments of the invention, support means in contact with the coated permeable membrane are provided to insure the dimensional stability of the flow passage upon the establishment of the above-mentioned pressure differential. The support means are made from a rigid porous material which will offer very little or no resistance to the passage of the gas therethrough and, therefore, will not inhibit the removal of the gas through the gas permeable membrane.

Accordingly, it is broadly the primary object of the present invention to provide new and useful apparatus for reducing the concentration of gas in a liquid.

It is a specific object of the present invention to provide apparatus for removing gas from a liquid in such a manner that the gas cannot recombine with the liquid.

Still another object of the present invention is to provide apparatus for reducing the concentration of gas in a liquid, which apparatus is capable of handling corrosive liquids.

Still another object of the present invention is to provide apparatus for reducing the gas concentration in the eluate in a chromatographic system which minimizes longitudinal mixing of the flow stream during operation of the apparatus.

Still another object of the present invention is to provide apparatus for reducing the gas concentration in the eluate in a chromatographic system which apparatus preserves the integrity of the eluate content distribution by not disturbing the peaks or zones of solute in the eluate.

Other objects and advantages will be apparent from the following description of several embodiments of the invention and the novel features will be particularly pointed out hereinafter in connection with the appended claims.

DESCRIPTION OF THE PREFERRED EMBODIMENT

Although the invention is described herein as applied to chromatographic systems, it will be understood, as noted above, that the invention is not restricted to this use and that there are many other applications in which the invention can be effectively utilized.

Figure 1:
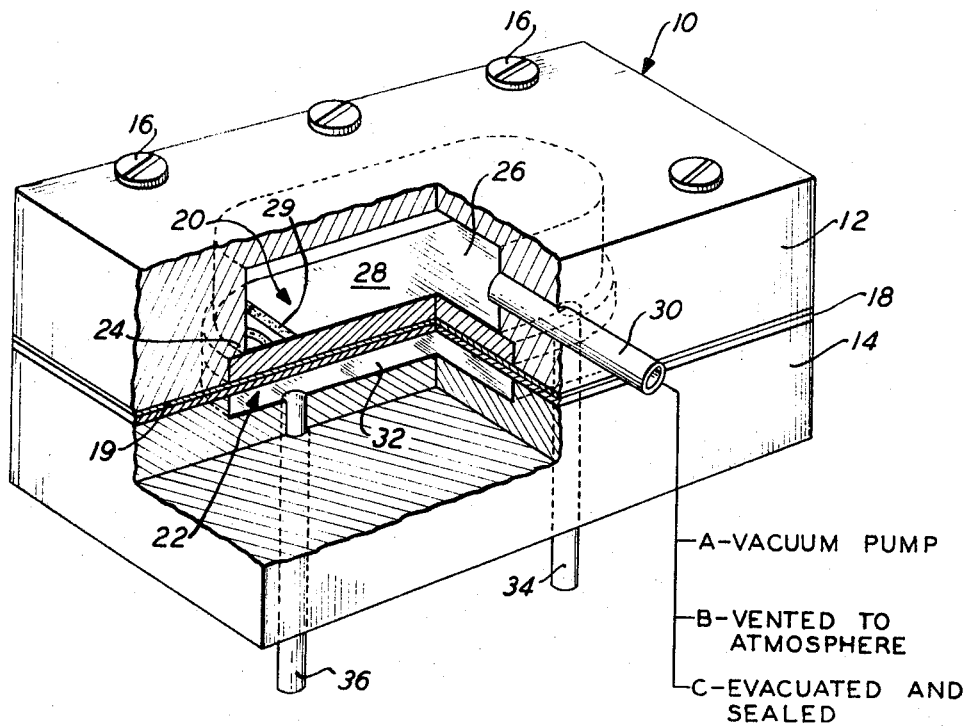
FIG. 1 is a perspective view, partially broken away, showing apparatus for reducing the gas concentration in a liquid, built in accordance with the teachings of the present invention.

FIG. 1 shows an apparatus, for reducing the gas concentration in the eluate from a chromatographic system, in the form of a housing or container, generally indicated at 10, having vertically aligned first and second sections, 12 and 14 respectively, secured together by a plurality of bolts 16. Between upper first section 12 and lower second section 14 of the apparatus is a gas permeable membrane 18 whose function will be explained in greater detail below. The upper section 12 and lower section 14 of housing or container 10 are provided with cavities 20 and 22, respectively, which cavities are separated by the permeable membrane 18.

Cavity 20 in upper section 12 is a comparatively deep recess, with an enlarged portion 24 at the bottom face of the section opposing the lower section of the housing. Enlarged portion 24 of cavity 20 holds a layer 26 of rigid, porous material, which is used to support permeable membrane 18. The portion of the cavity above support means 26 in the upper portion 12 of housing 10 forms, in cooperation with permeable membrane 18, a chamber 28 which, for example, may be communicated by tube 30 to a vacuum pump as indicated at A and the corresponding legend shown in FIG. 1. Alternatively, the tube, as indicated at B and C in FIG. 1, may be vented to the atmosphere or may be evacuated and sealed. It will be understood by those skilled in the art, that the specific termination of tube 30 will depend upon various known considerations, e.g., the pressure level of the liquid to have its gas concentration reduced, the expected volume of gas to be removed, the environment in which the degassing apparatus is located, and the chemical nature of the gas to be removed. Another alternative within the contemplation of the present invention is that the chamber 28 may, or may not be evacuated, depending upon various of the foregoing considerations, and the chamber may be provided with absorbent or adsorbent material 29 for accommodating the gas removed from the liquid; such adsorbent or absorbent material being chosen, as understood by those skilled in the art, for its compatibility with the gas to be removed.

The surface of the membrane 18 exposed to the chamber 28 is provided with a coating 19 for increasing the gas permeability of the membrane and for enhancing the permeation of the gas through the membrane. The coating 19 may be a substance or film of gas-soluble solid or liquid in which the gas to be passed through the membrane is appreciably soluble, for example, such film may be a film of silicone liquid or a film of fluorosilicone liquid. Also, the coating 19 may be a film of solid silicone compound or a film of solid fluorosilicone compound. The reason why such a coating increases the gas permeability of certain membranes, and enhances the permeation of gas therethrough, is not completely understood, however, it is believed that such a gas-soluble coating affects certain surface energy characteristics of the membrane that would otherwise prevent the gas from leaving the membrane and passing into the chamber 28.

The recess 22 in the lower portion 14 of container 10 forms, in cooperation with permeable membrane 18, a flow passage 32 for the chromatographic system eluate which is to have its gas concentration reduced. The eluate enters the flow passage 32 through the substantially vertical inlet conduit 34 extending perpendicularly through lower section 12 into the flow passage. Once in the flow passage, the substantial portion of the eluate will be in direct surface contact with the permeable membrane 18 as the eluate flows from inlet tube 34 to an outlet tube 36 disposed substantially parallel to the inlet tube in housing 10. At least a portion of the gas dissolved in the eluate will permeate through the membrane 18 and the coating 19 and into the chamber 28 with the permeation being enhanced by the coating 19. Thus the gas concentration in the eluate flowing through the flow passage 32 is reduced.

The depth of cavity 22 in lower portion 14 of housing 10 is much smaller than the depth of cavity 20 in upper portion 12 of the housing which forms chamber 28. Ideally, the depth of flow passage 32 should be no greater than the minimum thickness necessary to allow for the flow of a film of eluate through the apparatus so as to maximize the exposure of the eluate to the membrane. Further, the flow passage is relatively long compared to its cross-sectional area (width and depth) so that longitudinal mixing of the flowing liquid eluate is minimized.

Support means 26 plays an important role in certain embodiments of the present invention, since in some instances the permeable membrane 18 must be fairly thin, yet wide in area, to allow passage or permeating required in chamber 28 in order to provide the pressure differential necessary to induce a flow of the gas in the eluate across the permeable membrane. Therefore, the critical thickness dimension of the flow passage could be readily affected by distortion of the membrane caused by the pressure differential were it not for the means to support the membrane. Under such condition, the support means 26 is provided and is positioned in enlarged portion 24 of the upper recess 30 to insure the positive positioning of the membrane and, therefore, also insure that the dimensions of the flow passage will not change as the pressure in the chamber may be increased or decreased.

OTHER EMBODIMENTS OF THE INVENTION

Figure 2:
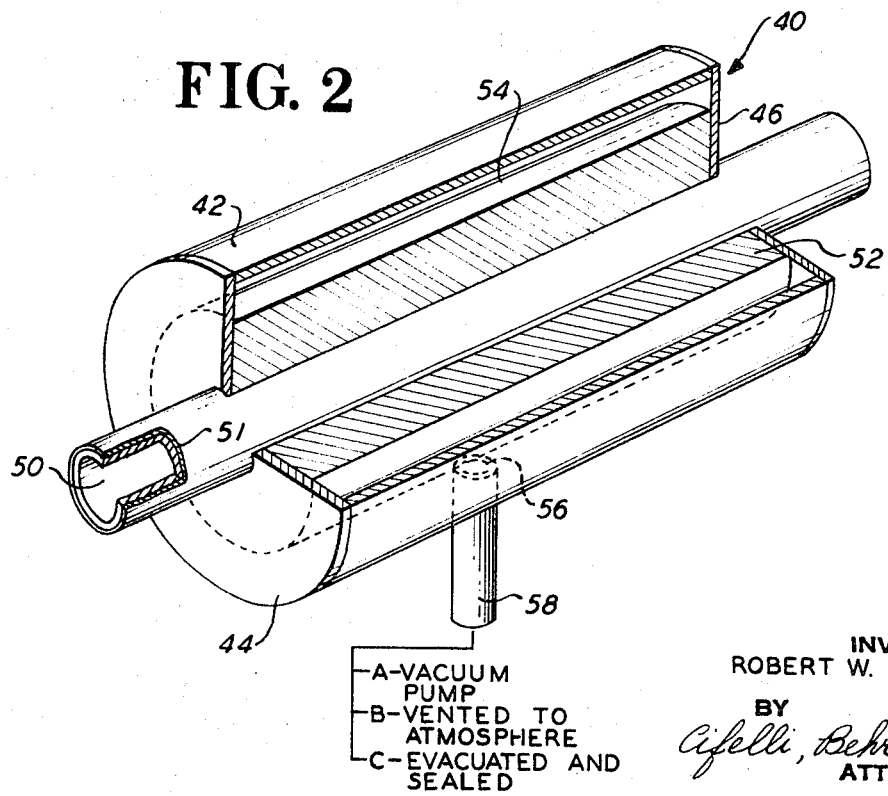
FIG. 2 is another embodiment of an apparatus for reducing the gas concentration in a liquid built in accordance with the teachings of the present invention, having a cylindrical configuration.

FIG. 2 shows another embodiment of the present invention. In this embodiment, the housing or container 40 of the apparatus for reducing the gas concentration in a liquid includes a cylindrical section 42 having end walls 44 and 46 respectively. A tubular gas permeable membrane 50, coaxially disposed with relation to the axis of the cylindrical section 40, extends through openings provided in the end walls 44 and 46 of the container. Support means, comprising an annulus of porous, rigid support material 52, is concentrically disposed about and in engagement with the permeable membrane 50 over the length of the membrane within container 40. The support material runs from front end 44 to rear end 46 of container 40 and has a diameter substantially smaller than the diameter of container 40, so that an annular chamber 54 is formed between the support member 52 and the tubular wall of container 50. The chamber 54 has an opening 56 which may be connected by a conduit 58 to the various connections or terminations included at A, B and C, and which terminations may be determined in accordance with the same considerations set forth with regard to the embodiment of FIG. 1. Alternatively, as before, the chamber 54 may or may not be evacuated and may be provided with suitable absorbent or adsorbent material for accommodating the removed gas.

The surface of the membrane 50 exposed to the chamber 54 is provided with a gas-soluble coating 51 which may be of the same type as the coating 19 described above with regard to the invention embodiment of FIG. 1.

The embodiment of FIG. 2 functions in a manner similar to that shown in FIG. 1. Eluate from the chromatographic system flows through tube 50 which is formed from the permeable material. At least a portion of the gas dissolved in the eluate will pass or permeate through the permeable membrane (such passage or permeation being enhanced by the increased permeability provided the membrane by the coating 51) through the support means 52 coaxially disposed about the permeable membrane 50, and into the chamber 54, where, depending upon the termination of the conduit 58, the removed gas may be exhausted by a vacuum pump, vented to the atmosphere, accommodated in the evacuated chamber 54, or absorbed or adsorbed by suitable material provided in the chamber 54.

Figure 3:
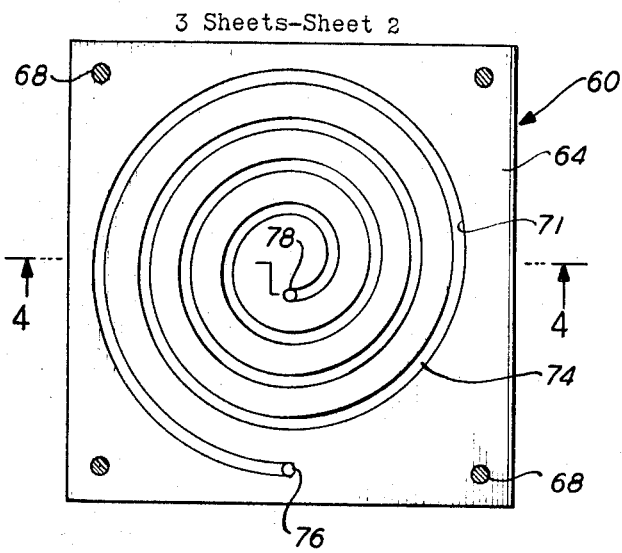
FIG. 3 is a top plan view in section of another embodiment of an apparatus built in accordance with the teachings of the invention, having a spiral flow path for the liquid.
Figure 4:
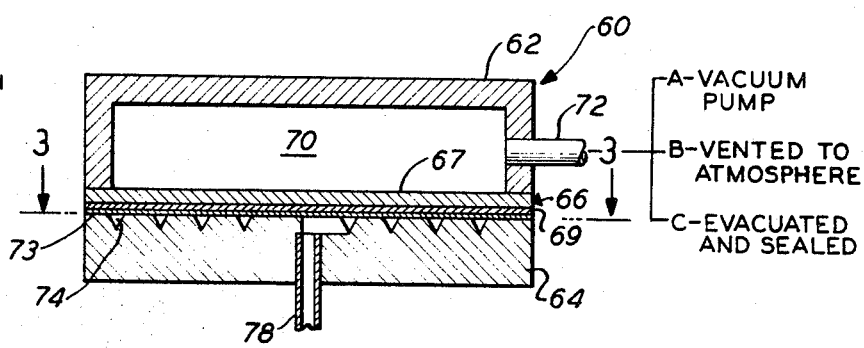
FIG. 4 is a front elevation, in section, taken along lines 4—4 of FIG. 3.

FIGS. 3 and 4 show another embodiment of the invention which is similar to the embodiment previously shown in FIG. 1. The apparatus, generally indicated at 60, includes a first or upper section 62 and a lower second section 64 separated by a membrane 66. The membrane 66 differs from the equivalent structure in the embodiment shown in FIG. 1 in that the membrane is a single structural element which functions both as a gas permeable membrane and as support means thus being a self-supporting gas permeable membrane. Such membrane may be formed in several different ways, such as by having a support structure 67 comprised of a rigid porous material, e.g. sintered stainless steel, sintered brass, or sintered TEFLON; with a first nonporous layer 69 of gas soluble and gas permeable material, e.g. silicone sprayed or bonded on to the face of the porous material; and a second non-porous thin layer 73 sprayed or bonded onto the first layer. The second layer is preferably a chemically inert gas permeable material which will be in contact with the liquid to have its gas concentration reduced.

As shown in FIG. 4, membrane 66 extends across the entire width of the apparatus in between the first section 62 and the second section 64; the sections being secured together by means of bolts (not shown) which enter bolt holes 68 shown in FIG. 3.

A chamber 70 is formed in upper cavity 62, is provided with a tube 72 which as indicated at A, B and C may be connected or terminated as described hereinabove with regard to chambers 28 and 54 of FIGS. 1 and 2, alternatively, the chamber 70 may be evacuated or not evacuated and filled, as taught above, with adsorbent or absorbent material.

As may be seen in FIG. 3, the main difference in the construction of second section 64 is the shape or configuration of the flow passage for the liquid to have its gas concentration reduced. The cavity 71 formed in lower section 64 is provided with a spiral configuration, and hence in cooperation with membrane 66 provides flow passage 74 with a spiral configuration having an inlet 76 for the liquid and an outlet 78 through which the liquid will leave the apparatus.

Further, it will be noted as shown in FIG. 4, the spiral cavity 71 is provided with a V-shaped cross-sectional configuration to increase the amount of exposure of the liquid in the flow passage to the membrane 66, and the depth of the cavity is equal to the minimum depth necessary to allow the flow of a film of the liquid through the flow passage. Further, the spirally configured flow passage 74 is relatively long as compared with its cross-sectional area so that longitudinal mixing of the liquid is minimized.

Figure 5:
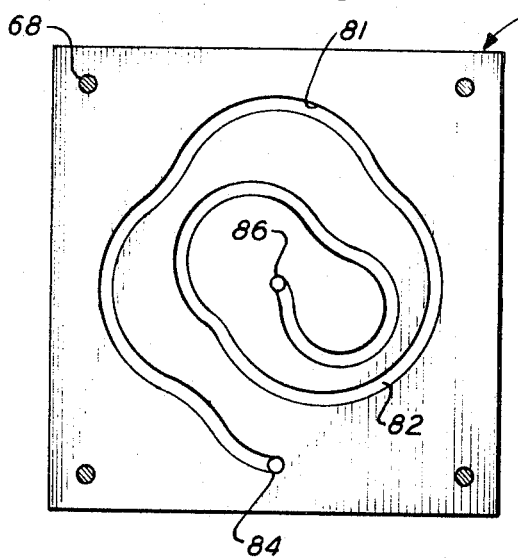
FIG. 5 FIG. a top plan view, in section, of another embodiment of an apparatus built in accordance with the teachings of the invention, having a serpentine flow path for the liquid.

The embodiment of the invention shown in FIG. 5 provides a serpentine configuration to the flow passage 82 for acommodating the liquid to have its gas concentration reduced. The second section of the embodiment shown in FIG. 5, generally indicated at 80, has a cavity 81 formed therein which is provided with a serpentine configuration so as to provide the flow passage 82 with a serpentine configuration. The flow passage is provided with an inlet port 84 and an outlet port 86, so that liquid entering inlet port 84 flows through the serpentine flow path to the outlet port 86.

Figure 6:
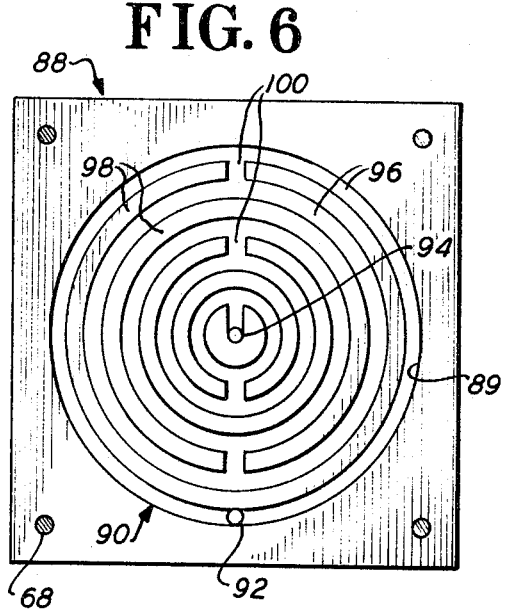
FIG. 6 is a top plan view, in section, of another embodiment of an apparatus built in accordance with the teachings of the invention, having a labyrinth flow path for the liquid.

The embodiment of the invention shown in FIG. 6 provides a labyrinthine flow passage 90 for the liquid to have its gas concentration reduced, which liquid flows through the apparatus. The second section of the apparatus shown in FIG. 6, generally indicated at 88, is provided with a cavity 89 including a series of concentrically disposed circular cavities 96, which are separated by a series of concentrically disposed barrier walls indicated at 98, the walls being pierced by a series of gates indicated at 100 to connect the concentric flow paths so as to provide a continuous flow path of the liquid from the inlet 92 to the outlet 94. The labyrinthine flow path is provided with an inlet port 92 and an outlet port 94, which is connected by the labyrinthine flow passage 90. It will be understood by those skilled in the art that, for example, with regard to the consideration of possible solute peak broadening of eluate from a chromatographic system, the labyrinthine flow passage configuration may be used more advantageously at relatively high eluate flow rates.

Operation of the embodiments shown in FIGS. 3 through 6 is substantially the same as the operation of the embodiments described above and shown in FIGS. 1 and 2.

Figure 7:
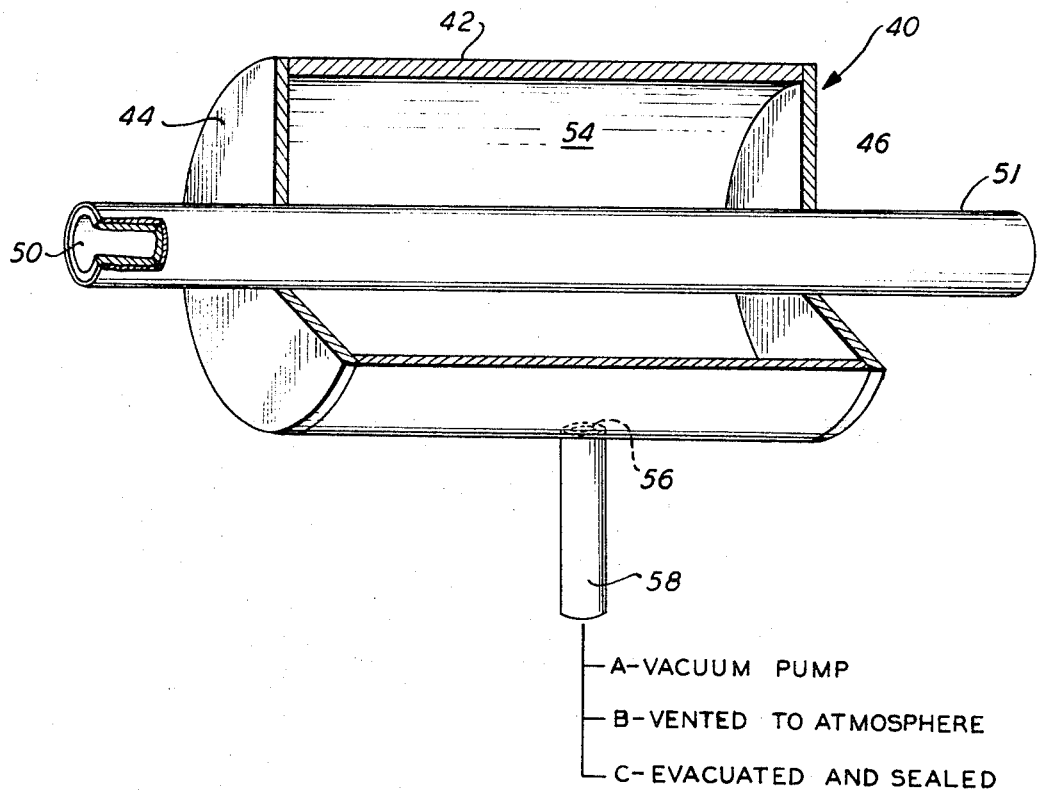
FIG. 7 is a perspective view, partially broken away, showing apparatus for removing gas from liquids built in accordance with the teachings of the present invention, having a cylindrical configuration as the embodiment shows in FIG. 2 and including a self-supporting gas permeable membrane.

Referring now to FIG. 7, there is shown an embodiment of the invention similar to the embodiment of FIG. 2, and accordingly, corresponding structure is correspondingly numbered. The embodiment of FIG. 7 differs from that of FIG. 2 by not including support means for the gas permeable membrane 50. It has been found that, depending upon the pressure of the liquid to have its gas concentration reduced, and the amount of the pressure differential which may be established between the liquid and the pressure in the chamber 54, the apparatus can function satisfactorily without any membrane support means. For example, it has been found that with a sufficiently high vacuum established in the pressure chamber 54 tubing, known in the trade as FEP TEFLON, having a sufficiently small diameter, functions satisfactorily without support in the embodiment of FIG. 7. The coating 51 provided on the membrane 50 may be the same as the aforementioned membrane coatings 19 of FIG. 1 and 51 of FIG. 2.

With further regard to the embodiment of FIG. 7, while not completely understood, it has been found that the tubular membrane 50, when coated with the gas-soluble coating 51 has the peculiar property of reducing, or tending to reduce, the gas concentration in the liquid flow stream passing through the tubing even if the coated surface of the membrane is exposed to the atmosphere and is not exposed to a pressure significantly lower than the pressure of the liquid. Accordingly, it will be expressly understood that apparatus for reducing the gas concentration in a liquid comprising only the gas permeable membrane provided with a coating of material in which the gas is significantly soluble, is within the contemplation of the present invention and that patent protection is sought therefor.

Referring again to FIG. 1, it will be also understood that it is within the contemplation of the present invention that the apparatus shown in FIG. 1 embodying the present invention may both include and not include the support means 26. When not including the support means, the membrane 18 would be unsupported but would be provided with the coating 19. Further, that it is within the contemplation of the present invention that the first membrane 18 of FIG. 1 be provided with the coating 19 and the coated membrane surface be exposed to the atmosphere, and that such structure, as with regard to the similar embodiment of FIG. 7, will reduce the gas concentration in a liquid exposed to such coated membrane.

With regard to the gas permeable membranes, both flat and tubular, it has been found that membranes having the property of abstracting and dissolving an appreciable quantity of the gas dissolved in a liquid in contact with the membranes, are particularly useful. More particularly, membranes of silicone rubber film, a silicone rubber-like material such as G.E. MEM 213; polyethylene; and fluorocarbon material, more specifically a fluorinated ethylene-propylene co-polymer material such as Dupont TEFLON FEP film; are particularly useful. Such membrane materials being particularly useful due to their resistance to corrosion, for example the corrosive eluate from a chromatographic column.

With regard to the support means of the various embodiments of the present invention, e.g. support 26 of FIG. 1 and support 52 of FIG. 2, it has been found that such support means may be comprised of sintered stainless steel, sintered brass or sintered TEFLON; such materials being resistant to corrosion from the eluate.

Similarly, it has been found that the housing or container for apparatus embodying the present invention, e.g. the sections 12 and 14 of FIG. 1 and container 40 of FIG. 2, may be made advantageously of a suitable corrosion resistant material, such as for example stainless steel.

With regard to the expression "reduce or reducing the gas concentration in a liquid," it will be understood by those skilled in the art that such terms connote the understanding that depending upon various known conditions, such as for example, the pressure level of the liquid including the gas, the nature of the liquid and gas included or dissolved therein, the subsequent utilization to be made of the liquid, various amounts or percentages of the gas may be removed, hence, the expression "reduce or reducing the gas concentration" is used to connote these relative considerations.

It will be noted by those skilled in the art that when the apparatus of the present invention set forth above is used in a chromatographic system, it does not require separate treatment of the eluate other than the eluate flow through a predetermined flow passage. No boiling or other treatment of the eluate is necessary. Further, the flow path of the eluate is relatively undisturbed and unimpeded by the apparatus of the invention. The dimensions of the flow path can readily be adjusted to provide adequate surface area for contact or exposure of the eluate with the permeable membrane while allowing sufficient velocity for the operation of the chromatographic process.

It will also be noted that once the gas has been separated from the eluate, the gas is removed and hence is prevented from recombining with the eluate.

It will be further noted that only the gas from the eluate will pass through the permeable membrane, while none of the eluate will pass through the membrane. Therefore, the associated apparatus for controlling the pressure in the pressure chamber can operate independently of corrosive characteristics of the eluate.

It will also be noted that the flow path of the eluate need not be agitated or otherwise unnecessarily disturbed. Therefore, a minimum of longitudinal mixing of the eluate is produced and it is possible to preserve the integrity of the eluate content distribution which often contains peaks or zones of solute.

It will be understood that various changes in the details, materials and arrangements of parts which have been herein described and illustrated in order to explain the nature of the invention may be made by those skilled in the art within the principle and scope of the invention as expressed in the appended claims.

I claim:

1. Gas removing apparatus comprising:
   a housing having a plurality of openings formed therein;
   tubular flow means within said housing having an inlet and outlet;
   inlet means for connecting said flow means inlet to a chromatographic column having a solvent with gas dissolved therein through a path free of introduced, undissolved gas; and
   outlet means for connecting the flow means outlet to an analyzing device;
   said tubular flow means including membrane means for lowering the dissolved gas concentration of the solvent to a level below the saturation level of the gas in the solvent;
   said membrane means including a membrane which is more permeable to the gas than to the solvent and a coat on said membrane in which said gas is soluble;
   said membrane having a first side and a second side;
   said first side being positioned to contact said solvent and said second side contacting said coat.

2. Gas removing apparatus according to claim 1 in which said coat is a film of liquid in which said gas is appreciably soluble.

3. Gas removing apparatus according to claim 2 in which said film of liquid is a film of light silicone.

4. Gas removing apparatus according to claim 2 in which said film of liquid is a film of a fluorosilicone liquid.

5. Gas removing apparatus according to claim 1 in which said coat is a film of solid silicone compound.

6. Gas removing apparatus according to claim 1 in which said coat is a film of solid fluorosilicone compound.

7. Gas removing apparatus according to claim 1 in which:
   said housing further includes a compartment adjacent to the membrane;
   said chromatographic apparatus further includes pressure means for creating a pressure in said compartment less than the pressure within said tubular flow means, whereby gas is removed from said solvent in said flow means.

8. Gas removing apparatus according to claim 7 further including pump means for evacuating said compartment to provide the pressure differential.

9. Gas removing apparatus according to claim 8 in which said membrane adjacent to said compartment is elongated and curved with a large surface area extending over a narrow section of said compartment.

10. Gas removing apparatus according to claim 9 in which the length of said flow means is large compared to its width.

11. Gas removing apparatus according to claim 10 in which said membrane is self-supporting and said pump means includes a means for creating a relatively large pressure differential in said compartment.

12. Gas removing apparatus according to claim 10 in which said membrane is thin and said flow means further includes a porous member between said membrane and said compartment supporting said membrane thereover.

13. Gas removing apparatus according to claim 10 in which said coat is a film of liquid in which said gas is appreciably soluble.

14. Gas removing apparatus according to claim 13 in which said film of liquid is a film of light silicone.

15. Gas removing apparatus according to claim 13 in which said film of liquid is a film of fluorosilicone liquid.

16. Gas removing apparatus according to claim 10 in which said coat is a film of solid silicone compound.

17. Gas removing apparatus according to claim 10 in which said coat is a film of solid fluorosilicone compound.

18. Gas removing apparatus according to claim 1 in which:
   said housing further includes a compartment adjacent to said membrane;
   said compartment including means for sorbing said gas in said chamber.

19. Gas removing apparatus according to claim 18 in which said means for sorbing includes an absorbent material.

20. Gas removing apparatus according to claim 18 in which said means for sorbing includes adsorbent material.

21. Gas removing apparatus according to claim 19 in which said coat is a film of liquid in which said gas is appreciably soluble.

22. Gas removing apparatus according to claim 21 in which said film of liquid is a film of light silicone.

23. Gas removing apparatus according to claim 21 in which said film of liquid is a film of fluorosilicone liquid.

24. Gas removing apparatus according to claim 19 in which said coat is a film of solid silicone compound.

25. Gas removing apparatus according to claim 19 in which said coat is a film of solid fluorosilicone compound.

26. Gas removing apparatus according to claim 20 in which said coat is a film of liquid in which gas is appreciably soluble.

27. Gas removing apparatus according to claim 26 in which said film of liquid is a film of light silicone.

28. Gas removing apparatus according to claim 26 in which said film of liquid is a film of fluorosilicone liquid.

29. Gas removing apparatus according to claim 20 in which said coat is a film of solid silicone compound.

30. Gas removing apparatus according to claim 20 in which said coat is a film of solid fluorosilicone compound.

* * * * *